June 23, 1964 W. C. THOMPSON 3,138,008
MEANS FOR MAKING FROZEN PRODUCTS INCLUDING A DETACHABLE COVER
Filed April 19, 1962 4 Sheets-Sheet 1
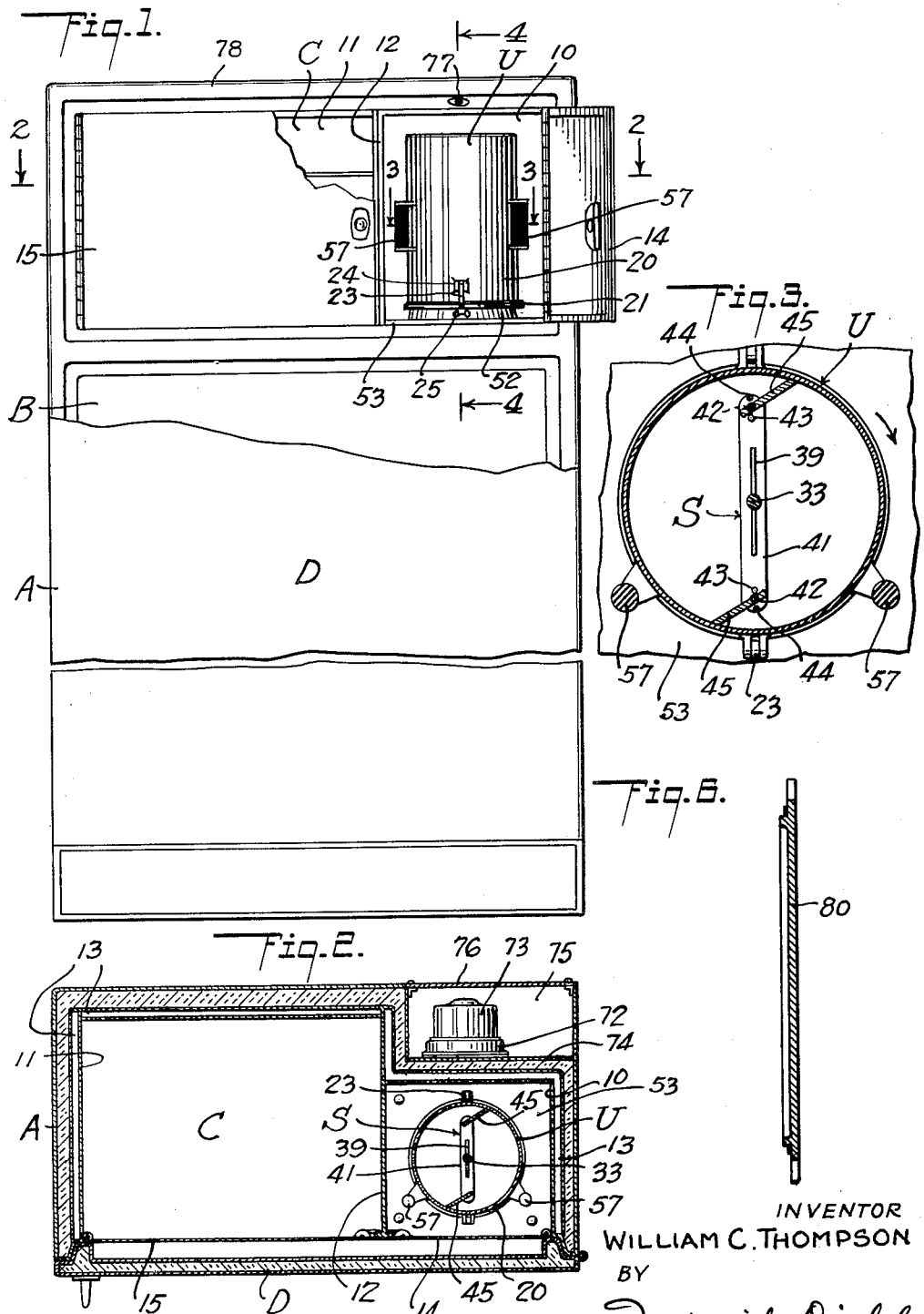
INVENTOR
WILLIAM C. THOMPSON
BY
Frederick Diehl
ATTORNEY

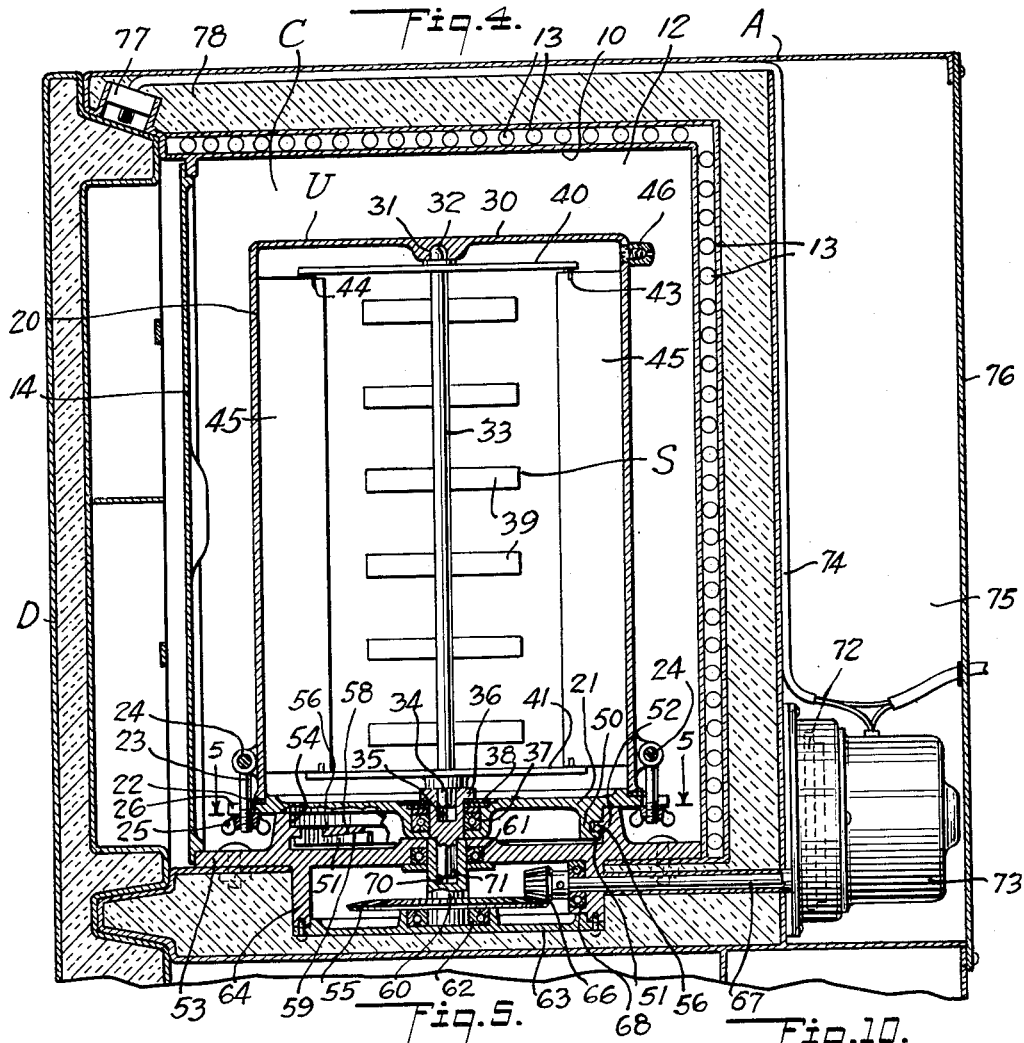
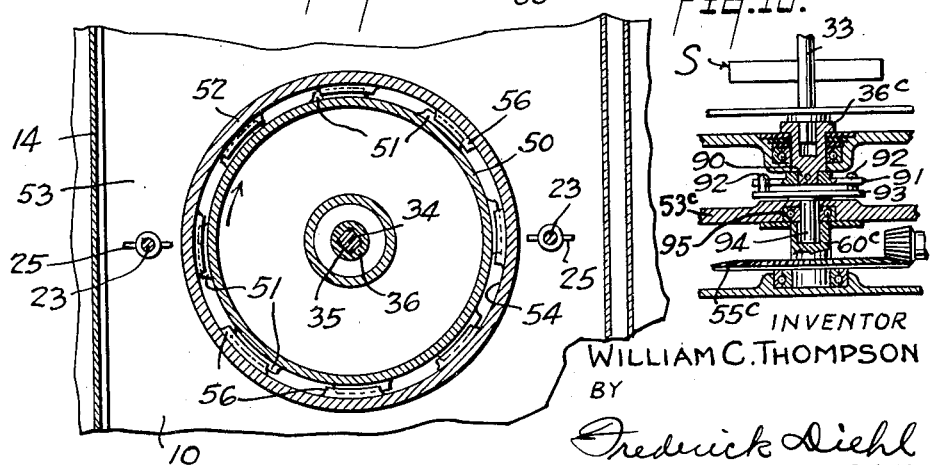

June 23, 1964 W. C. THOMPSON 3,138,008
MEANS FOR MAKING FROZEN PRODUCTS INCLUDING A DETACHABLE COVER
Filed April 19, 1962 4 Sheets-Sheet 3
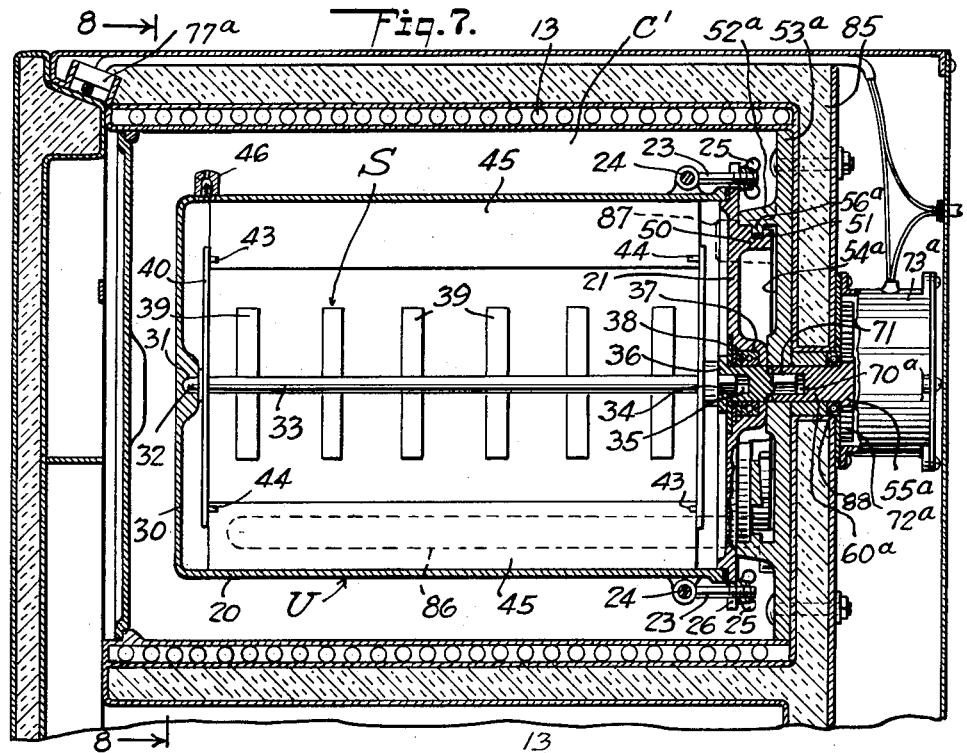
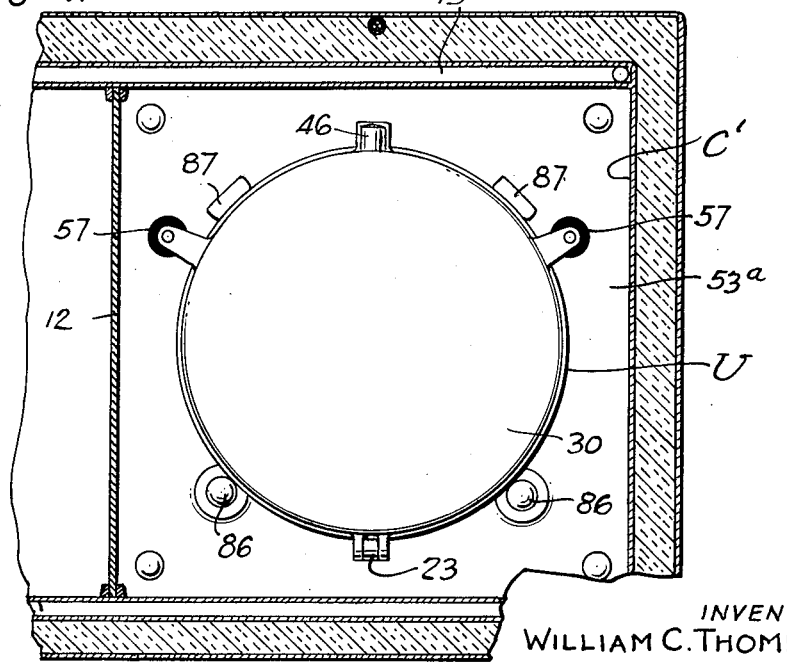
INVENTOR
WILLIAM C. THOMPSON
BY
Frederick Diehl
ATTORNEY June 23, 1964 W. C. THOMPSON 3,138,008
MEANS FOR MAKING FROZEN PRODUCTS INCLUDING A DETACHABLE COVER
Filed April 19, 1962 4 Sheets-Sheet 4

INVENTOR
WILLIAM C. THOMPSON
BY
Frederick Diehl
ATTORNEY

United States Patent Office 3,138,008
Patented June 23, 1964

3,138,008
MEANS FOR MAKING FROZEN PRODUCTS
INCLUDING A DETACHABLE COVER
William C. Thompson, P.O. Box 371,
Desert Hot Spring, Calif.
Filed Apr. 19, 1962, Ser. No. 188,741
8 Claims. (Cl. 62—298)

My invention relates generally to refrigerating apparatus and more particularly to refrigerators and freezer chests and cabinets in which food products are stored and maintained in a frozen state until removed for use.

An object of my invention is to provide refrigerating apparatus which is structurally characterized by power-driven means enabling frozen products such as ice cream and sherbet to be made in a relatively small portion of a freezer compartment by utilizing the cold producing mechanism of the refrigerator or freezer to maintain such compartment at a suitable temperature for the most efficient stirring and freezing of the necessary ingredients in a mixing unit, all to the end of enabling such products to be made with ease and convenience in a domestic appliance for home consumption whenever desired by providing such a facility in the home which is available for use at any time without detracting from the efficiency of the appliance or interfering with the use of practically the entire capacity of the freezer compartment for the storage of foods when a frozen product is not being made.

Another object of my invention is to provide refrigerating apparatus of the above described character in which the mixing unit is portable so as to be removably associated with the freezer compartment for convenient handling as well as complete sterilization of the mixing unit; the receptacle being readily inserted and supported in a predetermined position in the freezer compartment and operatively associated with a source of power to stir the mixture in the unit until the freezing operation is completed, upon which the unit can be disconnected from the power source and removed from the freezer compartment with the utmost ease and dispatch.

With these and other objects in view, my invention resides in the combinations, arrangements and functional relationships of elements as set forth in the following specification and particularly pointed out in the appended claims.

In the accompanying drawings,

FIGURE 1 is a view in front elevation, partly broken away, of a domestic refrigerating apparatus with one form of means for making frozen products embodying my invention embodied therein;

FIGURE 2 is a horizontal sectional view taken on the line 2—2 of FIGURE 1;

FIGURE 4 is an enlarged vertical sectional view taken on the line 4—4 of FIGURE 1;

FIGURE 5 is a horizontal sectional view taken on the line 5—5 of FIGURE 4;

FIGURE 6 is a sectional view of a blank cover which may be used with the receptacle of the mixing unit after the freezing operation has been completed;

FIGURE 7 is an enlarged vertical sectional view illustrating a second form of my invention associated with a freezing compartment of an appliance;

FIGURE 8 is a vertical sectional view taken on the line 8—8 of FIGURE 7;

FIGURE 9 is a vertical sectional view illustrating a third form of my invention associated with a freezing compartment of an appliance; and FIGURE 10 is an enlarged fragmentary sectional view of an optional form of operative connection between the mixing unit and the source of power.

Figure 3:
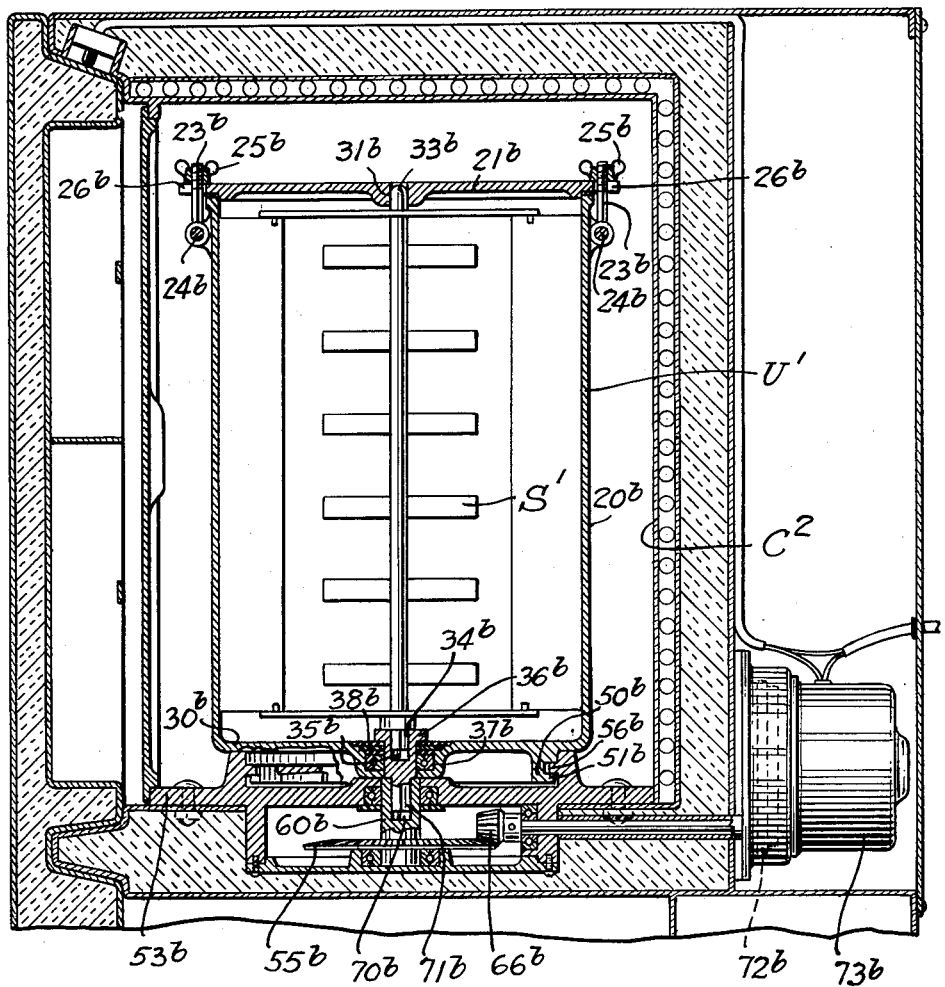
FIGURE 3 is an enlarged detail sectional view taken on the line 3—3 of FIGURE 1.

Referring specifically to the drawings and particularly to FIGURES 1 to 6, inclusive, this form of my invention is shown for the purpose of illustration associated with a domestic refrigerator freezer A having a refrigerating compartment B and a freezer compartment C which may be closed by a single door D or by separate doors (not shown). For the purpose of my invention, one end portion 10 of the freezer compartment C may be separated from the relatively large remaining portion 11 in which food is stored in a usual manner in a frozen state, by means of a vertical wall or partition 12. This wall may be uninsulated as shown or may be insulated in the event that it is desired to utilize the usual cold producing mechanism of the refrigerator which includes the refrigerant tubes 13 around the compartment C, in providing two different freezing temperatures in the portions 10 and 11, as will be clear to those familiar with the art. Separate doors 14 and 15 or a single door (not shown) may be provided to close the portions 10 and 11, respectively, of the compartment C.

The mixing unit embodying my invention is indicated by U and comprises an open-topped cylindrical, metal receptacle 20 provided with a cover 21 having a sealing ring 22 and adapted to be clamped to the receptacle to close same by means of a plurality of screws 23 pivoted at 24 on the receptacle and having thumb nuts 25 for tightening the cover on the receptacle when the screws are swung to the position shown in FIGURE 4 wherein they enter slots 26 in the periphery of the cover.

The bottom 30 of the receptacle 20 is provided with a bearing 31 to rotatably receive one end 32 of the shaft 33 of a stirring element S. When the cover is applied to the receptacle as shown in FIGURE 4, the other end 34 of the shaft 33 which is square or of other non-circular cross section, is adapted to enter a socket 35 of complementary cross section in a driving connector 36 rotatably mounted in a bearing 37 in the cover 21 and in a fluid-tight seal 38.

The shaft 33 is provided with stirring paddles or vanes 39 projecting therefrom at spaced locations along its length, and is further provided adjacent to its ends with arms 40 and 41 on which are pivotally mounted at 42 for movement between stops 43 and 44, scraper blades 45 adapted for scraping engagement with the side wall of the receptacle. Mounted on the receptacle is an inwardly opening spring loaded check valve 46 for admitting air to the receptacle during the freezing operation.

The cover 21 of the receptacle 20 is provided on its outer side with an annular flange 50 having a series of circumferentially spaced cam locking lugs 51 projecting radially outward therefrom. When the receptacle with its cover applied is inverted, the cover is adapted to seat upon an annular flange 52 on a support in the form of a flat plate 53 rigidly secured in a horizontal position to the bottom wall of the compartment C. With the cover seated on the flange 52, the cover flange 50 is adapted to enter a circular recess 54 defined by the flange 52 so as to center and axially aline the driving connector 36 with a driving member 55.

Projecting from the flange 52 into the recess 54 is a series of locking lugs 56 complementary to the lugs 51 of the cover 21 for interengagement with the lugs 51 upon rotating the receptacle with its handles 57 on the flange 52 in a clockwise direction as viewed in FIGURE 3, to cause the confronting wedging surfaces 58 and 59 of the lugs 51 and 56, respectively, to co-act in wedging the cover on the flange and thus rigidly securing the receptacle 20 in an inverted vertical position to the support 53.

In the present instance the driving member 55 is in the form of a bevel gear having a hub 60 one end of which is journaled in a bearing 61 in the support 53, and the other end in a bearing 62 in a cover plate 63. The cover plate 63 closes the open bottom of a housing 64 on the support 53 so as to enclose the gear 55 and a driving pinion 66 meshing with the gear 55 and fixed to a drive shaft 67 journaled in a bearing 68 in the housing 64 and projecting to a point rearwardly of the compartment C.

That portion of the hub 60 which is mounted in the bearing 61 is provided with a socket 70 of square or other non-circular cross section in which a stub shaft 71 of complementary cross section forming part of the driving connector 36 is received upon mounting the receptacle 20 on the support 53 to operatively connect the shaft 33 to the gear 55 through the driving connector 36.

The outer end of the drive shaft 67 is connected through suitable reduction gearing 72 to a source of power such as an electric motor 73 which is supported on the rear wall 74 of the compartment C in an unrefrigerated space 75, and is rendered accessible upon removal of a cover plate 76 for the space 75. Current from the usual domestic source is supplied to the motor 73 under the control of a switch 77 which may be disposed at a conveniently accessible location such as in the top wall 78 of the compartment C for manipulation when the door D is open. The handles 57 which are suitably insulated enable the mixing unit U to be readily manipulated in the operation of the invention which is as follows:

The mixture to be frozen is poured into the receptacle 20 when placed upright on a table or counter, it being desirable to precool the mixture in the case of ice cream, to a temperature of approximately 40 degrees Fahrenheit. The shaft 33 of the stirring element S is applied to the bearing 31 on the bottom 30 of the receptacle and then to the socket 35 of the driving connector 36 as the cover 21 is applied to the receptacle, following which the cover is clamped fluid-tight to the receptacle by the screws 23 and nuts 25.

The mixing unit U is lifted by the handles 57 and then adjusted rotatably above the supporting plate 53 to first enter the stub shaft 71 of the driving connector 36 in the socket 70 so as to operatively connect the stirring element S to the motor 73, following which any further rotatable adjustment of the unit is effected if necessary for the lugs 51 on the cover 21 to pass between the lugs 56 of the support 53. Additional rotatable adjustment of the mixing unit in the clockwise direction indicated by the arrow in FIGURE 3 is effected to cause the surfaces 58 and 59 of the respective lugs 51 and 56 to co-act in rigidly securing the mixing unit to the support 53.

The switch 77 is now closed to supply current to the motor 73 which drives the stirring element S in the aforesaid clockwise direction so that the action of the paddles 39 in stirring the mixture in the receptacle, and that of the scraper blades 45 against the wall of the receptacle 20 will tend with increasing force as the mixture freezes, to tighten the cover 21 upon the support 53, thus maintaining the mixing unit rigidly connected to the support during the freezing operation without any extraneous fastening means.

When the freezing operation has advanced sufficiently to freeze the mixture to a predetermined consistency under the action of the low temperature maintained in the compartment C by the refrigerating mechanism of the freezer, the motor 73 is stopped and the mixing unit removed from the compartment C and turned upright, followed by removal of the cover 21 and the withdrawal of the stirring element S from the receptacle. A blank cover 80 shown in FIGURE 6 is now applied to the receptacle and clamped thereto by the screws 23 and nuts 25, following which the unit may be placed in the refrigerator for hardening of the ice cream and storage until it is to be consumed.

The motor 73 may be equipped with a well known form of torque-responsive device (not shown) for opening the motor circuit when a predetermined resistance of the mixture in the receptacle to rotation of the stirring element is reached, and may include an indicator lamp (not shown) which will glow to indicate this condition, all of which constitutes no part of my present invention. It is to be noted that this form of my invention with the driving mechanism located beneath the freezer compartment C is adapted for use both in a freezer compartment of a refrigerator-freezer and in a freezer chest.

Reference will now be had to FIGURES 7 and 8 which illustrate a second form of my invention in which the previously described mixing unit U is supported horizontally in a freezer compartment C' of a refrigerator or freezer. For this purpose a support in the form of a flat plate 53a is rigidly secured in a vertical position to the rear wall 85 of the compartment and is provided with an annular flange 52a defining an annular recess 54a into which projects from the flange 52a cam lugs 56a identical in construction and arrangement to the lugs 56 for co-action with the lugs 51 of the cover 21 in the same manner previously described in the first form of my invention, so as to rigidly secure the unit U in a horizontal position to the support.

Rigidly secured to the support 53a and projecting horizontally therefrom are spaced supporting members in the form of parallel rods 86 on which the mixing unit U can be placed so as to be easily and conveniently slid into and out of the compartment C'. The rods 86 co-act with spaced guide lugs 87 projecting from the support 53a to center and aline the stub shaft 71 of the driving connector 36 with a complementarily shaped socket 70a in the hub 60a of a driving member 55a. The member 55a is in the form of a spur gear journaled in a bearing 88 in the housing of an electric motor 73a secured to the rear wall 85 and including suitable reduction gearing 72a which drives the member 55a in a direction to maintain the lugs 51 and 56a tightly interengaged in the manner previously described. The motor 73a is controlled by a suitable conveniently accessible switch 77a. As the operation of this form of my invention is identical to that described in connection with the first form of my invention, further description will be dispensed with.

Reference will now be had to FIGURE 9 showing a third form of my invention in which the mixing unit U' has a driving connector 36b journaled in a bearing 37b in the closed bottom 30b of the receptacle 20b and provided with a fluid-tight seal 38b. The open top of the receptacle 20b is closed by a removable cover 21b adapted to be clamped to the receptacle by screws 23b pivoted at 24b on the receptacle and having thumb nuts 25b for tightening the cover on the receptacle when the screws are swung to enter slots 26b in the periphery of the cover.

A stirring element S' identical in construction to that described in connection with the first and second forms of my invention has the end 34b of its shaft 33b of square or other noncircular cross section adapted to enter the socket 35b of complementary cross section in the driving connector 36b. The cover 21b is provided with a central opening defining an air vent and forming a bearing 31b in which the other end of the shaft 33b is freely received when the cover is applied to the receptacle as shown, so that the stirring element will be rotatably mounted in the receptacle and operatively connected to the driving connector 36b so as to be driven thereby.

For the purpose of illustration the receptacle 20b may be secured in a freezer compartment $C^2$ of a freezer chest or refrigerator-freezer by means of a support 53b which is identical in construction and arrangement to that of the support 53. The stirring element S' is driven through the connector 36b by an electric motor 73b, reduction gearing 72b driving pinion 66b and driving gear 55b, the hub 60b of which latter has a socket 70b of square or other non-circular cross section which receives the stub shaft 71b of the driving connector 36b when the mixing unit U' is mounted on the support 53b as shown.

The closed bottom 30b of the receptacle 20b is provided with an annular flange 50b having a series of circumferentially spaced cam locking lugs 51b for co-action with cam lugs 56b of identical construction to the lugs 56 for co-action with the lugs 51b in the identical manner described in connection with the first and second forms of my invention, so as to rigidly secure the unit U' in an upright position to the support.

Reference will now be had to FIGURE 10 which illustrates an optional form of operative connection between the mixing unit and the source of power. The driving connector 36c is provided with a shank 90 to which is fixed a cross bar 91 disposed in the path of revolving movement of pins 92 carried by a second cross bar 93 projecting from a shaft 94 journaled in a bearing 95 in a support 53c and fixed to the hub 60c of a driving member 55c so as to rotate the stirring element when power is applied to the driving member 36c as described in all forms of my invention.

I claim:

1. In a refrigerating apparatus having a freezer compartment adapted to be maintained at a predetermined freezing temperature; a support in the freezer compartment; a portable mixing unit adapted to contain a liquid mixture to be frozen and having a rotary stirring element; a source of power supported by the apparatus and including a rotary driving member; said mixing unit and support having co-acting means operable by a wedging action therebetween resulting from rotational movement of the unit relative to the support in one direction, to releasably secure the mixing unit rigidly to the support; said mixing unit and said driving member having means co-acting to operatively connect said stirring element to said power source; said power source rotating the stirring element when the unit is secured to the support with said stirring element being driven in a direction to utilize resistance of said mixture in said unit to rotation of said stirring element, in tending to maintain the unit secured to the support.

2. In a refrigerating apparatus having a freezer compartment adapted to be maintained at a predetermined freezing temperature; a support in the freezer compartment; a portable mixing unit adapted to contain a liquid mixture to be frozen and having a rotary stirring element; a source of power supported by the apparatus and including a rotary driving member; said mixing unit and support having co-acting cam lugs interengageable and operable by a wedging action therebetween resulting from rotational movement of the mixing unit in one direction, to releasably secure said unit to the support; said mixing unit and driving member having means co-acting when said unit is secured to the support, to define an operative connection through which said stirring element is driven by the power source; said power source rotating said stirring element in a direction utilizing the resistance of said mixture in said unit to rotation of the stirring element therein, to tend to increase the wedging interengagement of said cam lugs and thus maintain the unit secured to the support.

3. In a refrigerating apparatus having a freezer compartment adapted to be maintained at a predetermined freezing temperature; a support in the freezer compartment; a portable mixing unit adapted to contain a liquid mixture to be frozen and having a rotary stirring element; a source of power supported by the apparatus and including a rotary driving member; said mixing unit and support having circular series of circumferentially spaced locking lugs provided with wedging surfaces interengageable by rotational movement of the mixing unit in one direction in which said lugs co-act to releasably secure the mixing unit to the support; said stirring element and said driving member having means defining an operative connection when said unit is secured to the support, through which said stirring element is driven by the power source; said power source rotating the stirring element in a direction utilizing the load imposed by said mixture in the mixing unit upon said stirring element, to tend to tighten the fastening of said unit to the support by said lugs, whereby to maintain the unit secured to the support.

4. In a refrigerating apparatus having a freezer compartment adapted to be maintained at a predetermined freezing temperature; a receptacle adapted to contain a mixture to be frozen; a cover; means for releasably securing the cover fluid-tight to the receptacle; a driving connector rotatably mounted and sealed fluid-tight to said cover; a stirring element having a shaft rotatably mounted at one end in the bottom of the receptacle; the other end of said shaft and said driving connector having co-acting means defining an operative connection therebetween and mounting said shaft in the cover for rotation by said connector when the cover is applied to said receptacle; a support in the freezer compartment; said cover and support having co-acting means securing said receptacle to the support by rotational movement of the unit relative to the support in one direction; an electric motor supported by the apparatus; and means operatively connecting said driving connector to said motor when said unit is secured to the support; said motor rotating said stirring element in a direction to utilize the resistance of the mixture in said receptacle to rotation of the stirring element in tending to maintain the unit secured to the support by the aforesaid co-acting means.

5. In a refrigerating apparatus having a freezer compartment adapted to be maintained at a predetermined freezing temperature; a receptacle adapted to contain a mixture to be frozen; a cover; means for detachably securing the cover fluid-tight to the receptacle; a driving connector rotatably mounted and sealed fluid-tight in said cover; a stirring element having a shaft rotatably mounted at one end in the bottom of the receptacle; the other end of said shaft and said driving connector having co-acting means defining an operative connection therebetween and mounting said shaft in the cover for rotation by said connector when the cover is applied to the receptacle; a support in the freezer compartment; said cover having an annular flange provided with circumferentially spaced locking lugs; said support having an annular flange defining a recess receiving said flange of the cover to confine the receptacle against lateral displacement; said flange of the support having circumferentially spaced locking lugs with which said lugs of the cover interengage in response to rotation of the receptacle in one direction relative to the support, so as to secure the receptacle to the support; an electric motor supported by the apparatus; and means operatively connecting said driving connector to said motor when said receptacle is secured to the support by said lugs, so as to drive the stirring element from the motor.

6. A portable mixing unit of the class described comprising: a receptacle open at one end; a cover closing said one end of the receptacle; means for securing the cover fluid-tight to the receptacle; a driving connector rotatably mounted permanently in the cover and having means adapted for an axially separable operative connection to a rotary driving member in a freezer space of a refrigerating apparatus, so as to be driven thereby; a stirring element having a shaft rotatably mounted at one end in the bottom of the receptacle; the other end of said shaft and said driving connector having co-acting means defining an axially separable operative connection therebetween and mounting said shaft in the cover for rotation by said connector when the cover is applied to the receptacle; said cover having circumferentially spaced locking lugs adapted to co-act with locking lugs in the freezer space.

7. A portable mixing unit for use in making frozen products comprising: a receptacle having an open top and a closed bottom; a cover; means for securing the cover to the receptacle to close the open top thereof; a driving connector journaled and sealed fluid-tight in the bottom of the receptacle and having means adapted for an axially separable operative connection to a rotary driving member in a freezer space of a refrigerating apparatus so as to be driven thereby; a stirring element having a shaft rotatably mounted at one end in said cover when applied to the receptacle; the other end of said shaft and said driving connector having co-acting means defining an axially separable driving connection therebetween; and securing means on the bottom of the receptacle adapted to co-act in securing the unit in a predetermined position in the freezer space.

8. In a refrigerating apparatus having a freezer compartment adapted to be maintained at a predetermined freezing temperature, a mixing unit comprising: a receptacle adapted to contain a liquid mixture to be frozen and having a stirring element provided with a rotatably mounted shaft; a support in the freezer compartment; the mixing unit having an annular flange provided with circumferentially spaced locking lugs; said support having an annular flange defining a recess receiving said flange of the mixing unit to confine the latter against lateral displacement; said flange of the support having circumferentially spaced locking lugs with which said locking lugs of the mixing unit interengage so as to secure the mixing unit to the support; an electric motor; and means operatively connecting said shaft to said motor when the mixing unit is secured to the support, so as to drive the stirring element from the motor.

References Cited in the file of this patent

UNITED STATES PATENTS

| | | |
|---|---|---|
| 1,555,701 | Prichard et al. | Sept. 29, 1925 |
| 1,998,841 | Modlin | Apr. 23, 1935 |
| 2,055,735 | Stull | Sept. 29, 1936 |
| 2,125,693 | Ralph | Aug. 2, 1938 |
| 2,511,313 | Yoke | June 13, 1950 |
| 2,557,813 | Burton | June 19, 1951 |